US010724292B2

(12) United States Patent
Berard et al.

(10) Patent No.: US 10,724,292 B2
(45) Date of Patent: *Jul. 28, 2020

(54) MANUFACTURE OF LAMINATED GLAZING (71) Applicant: SAINT-GOBAIN GLASS FRANCE, Courbevoie (FR)

(72) Inventors: Stéphane Berard, Mouy (FR); Alexandre Hennion, Venette (FR); Philippe Frebourg, Senlis (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 520 days.

This patent is subject to a terminal disclaimer.

(21) Appl. No.: 15/594,112

(22) Filed: May 12, 2017

(65) Prior Publication Data

US 2017/0314321 A1   Nov. 2, 2017

Related U.S. Application Data (63) Continuation of application No. 14/351,077, filed as application No. PCT/FR2012/052329 on Oct. 12, 2012, now Pat. No. 9,670,714.

(30) Foreign Application Priority Data

Oct. 14, 2011 (FR) ...................................... 11 59322

(51) Int. Cl.
*E06B 3/673* (2006.01)
*C03B 27/044* (2006.01)
(Continued)

(52) U.S. Cl.
CPC ........ *E06B 3/673* (2013.01); *B32B 17/10036* (2013.01); *B32B 17/1099* (2013.01);
(Continued)

(58) Field of Classification Search
CPC ........ B32B 17/10146; B32B 17/10091; B32B 17/10055
See application file for complete search history.

(56) References Cited

U.S. PATENT DOCUMENTS 2,897,632 A    8/1959  Fowler et al.
4,023,945 A *  5/1977  Boaz ....................... C03B 21/00
                                                   65/112
(Continued)

FOREIGN PATENT DOCUMENTS

DE    4324847     1/1995
DE    10327559    1/2005
(Continued)

OTHER PUBLICATIONS

Notice of Reasons for Rejection as issued in Japanese Patent Application No. 2017-057576, dated Jan. 30, 2018.
(Continued)

*Primary Examiner* — David Sample
(74) *Attorney, Agent, or Firm* — Pillsbury Winthrop Shaw Pittman LLP (57) ABSTRACT

A laminated includes two bent glass substrates, a polymer interlayer between the glass substrates, and a notch or orifice cut in an entire thickness of the glazing. The glazing includes a border of compressive edge stresses obtained by general controlled cooling of the substrates in a paired state so that compressive stresses are generated at the border, and a local compression zone, different from the border, and obtained by local controlled cooling of a local area of a main surface of the glazing so that compressive stresses are generated in theid local compression zone. The notch or orifice is located in the local compression zone and made in the substrates in a paired state after forming the local compression zone so that cut contours of the substrates in the notch or orifice have
(Continued)

a perfect superposition. The compressive edge stresses of the cut contours are greater than 4 MPa.

26 Claims, 4 Drawing Sheets

(51) Int. Cl.
  *B32B 17/10* (2006.01)
  *C03B 27/04* (2006.01)
  *C03B 27/004* (2006.01)
  *C03B 23/035* (2006.01)
  *C03B 23/03* (2006.01)
  *C03B 23/025* (2006.01)
  *C03B 23/023* (2006.01)
  *B60J 7/043* (2006.01)
  *B60J 1/00* (2006.01)
  *C03B 33/07* (2006.01)

(52) U.S. Cl.
  CPC .. *B32B 17/10293* (2013.01); *B32B 17/10761* (2013.01); *B32B 17/10981* (2013.01); *B60J 1/001* (2013.01); *B60J 7/043* (2013.01); *C03B 23/023* (2013.01); *C03B 23/0252* (2013.01); *C03B 23/0258* (2013.01); *C03B 23/03* (2013.01); *C03B 23/0352* (2013.01); *C03B 27/004* (2013.01); *C03B 27/0404* (2013.01); *C03B 27/0413* (2013.01); *C03B 27/0442* (2013.01); *C03B 33/078* (2013.01); *Y10T 29/49826* (2015.01); *Y10T 428/24322* (2015.01); *Y10T 428/24612* (2015.01); *Y10T 428/24628* (2015.01)

(56) References Cited

U.S. PATENT DOCUMENTS

| | | | |
|---|---|---|---|
| 4,124,367 A | 11/1978 | Reese et al. | |
| 4,702,042 A | 10/1987 | Herrington | |
| 4,824,712 A * | 4/1989 | Falleroni | C03B 27/012 428/137 |
| 5,397,647 A * | 3/1995 | Kramling | B32B 17/10981 428/426 |
| 5,779,755 A * | 7/1998 | Kuster | C03B 27/004 65/348 |
| 9,067,622 B2 * | 6/2015 | Hennion | B62D 25/06 |
| 9,670,714 B2 * | 6/2017 | Berard | C03B 23/0252 |
| 2002/0064626 A1 * | 5/2002 | Shukuri | B60J 1/008 428/156 |
| 2002/0106519 A1 | 8/2002 | Takahara | |
| 2009/0045655 A1 | 2/2009 | Willard et al. | |
| 2010/0059523 A1 * | 3/2010 | Muhlhausen | B65D 51/28 220/521 |
| 2011/0272974 A1 | 11/2011 | Labrot | |
| 2011/0314871 A1 * | 12/2011 | Olivier | C03B 23/0252 65/104 |

FOREIGN PATENT DOCUMENTS

| | | |
|---|---|---|
| DE | 102004063377 | 7/2005 |
| DE | 60014692 | 10/2005 |
| DE | 202005006879 | 8/2006 |
| DE | 102006056501 | 6/2008 |
| DE | 102009017805 | 10/2010 |
| EP | 1 834 820 | 9/2007 |
| GB | 1 289 488 A | 9/1972 |
| JP | S46-043236 B | 12/1971 |
| KR | 10-2010-0016981 A | 2/2010 |
| WO | WO 02/07967 | 1/2002 |
| WO | WO 02/064519 | 8/2002 |
| WO | WO 2004/087590 | 10/2004 |
| WO | WO 2006/072721 | 7/2006 |
| WO | WO 2006/129504 | 12/2006 |
| WO | WO 2010/100223 | 9/2010 |
| WO | WO 2010/100379 A1 | 9/2010 |

OTHER PUBLICATIONS

International Search Report as issued for International Application No. PCT/FR2012/052329, dated Mar. 11, 2013.

* cited by examiner

MANUFACTURE OF LAMINATED GLAZING

CROSS-REFERENCE TO RELATED APPLICATIONS

This application is a divisional of U.S. Ser. No. 14/351,077, filed on Apr. 10, 2014, which is the U.S. National Stage of PCT/FR2012/052329, filed Oct. 12, 2012, which in turn claims priority to French Application No. 1159322, filed Oct. 14, 2011. The content of both applications are incorporated herein by reference in their entirety.

The invention relates to a process for manufacturing laminated glazing comprising the cutting thereof after assembly of glass substrates with an interlayer of polymer material type. The cutting is carried out through the entire thickness of the laminate and may especially be carried out in order to form at least one cut-away portion such as a hole or a notch, the edges of this zone having residual compressive stresses. The cutting may also be carried out from one edge to the other of the glazing.

During the use thereof, the glazing is subjected to thermal or mechanical stresses, in particular during the handling thereof, which it must withstand in order to prevent the breaking thereof. For example, the windshields of a vehicle are subjected to mechanical forces at their periphery during the mounting thereof on a body, whether manually or via a robot.

Besides the mechanical stresses, the glazing is subjected to stresses of thermal origin during windshield deicing cycles.

These stresses at the edges, of thermal or mechanical origin, cause risks of breakage in particular at the edges of the glazing. In order to guarantee a good mechanical strength of the glazing, compressive edge stresses are generated during the manufacture of the glazing. These edge stresses are known and specified in the specifications of motor vehicle manufacturers.

Besides the edges of glazing having compressive stresses, compressive stresses are also generated at the perimeter of cut-away portions.

Indeed, the cut-away portions in glazing are designed to receive added-on functional elements, such as for example an antenna fastened within a drilling made in the thickness and at a distance from the edge of the glazing. These cut-away portions will create two problems for the resistance to mechanical stresses: the recess creates an edge which will have to withstand loading during use of the glazing and the recess creates a stress concentration zone due to the local removal of material (hole, notch). In this regard, the glazing is subjected, at the edge of its hole or notch, to various mechanical stresses which are those that are permanent due to the attachment of the antenna, and those which are transient occurring in particular during an impact on the antenna such as when the vehicle passes under something low. Similarly, if, for the glazing of a tailgate, the hole is intended to receive a wiper, the edge of the hole must withstand the closure of the tailgate.

Stresses in glass products are generated when the glass is heated at a temperature starting from which it loses its pure elastic behavior and becomes slightly plastic, of viscoelastic liquid type. During cooling and as a function of the initial thermal inhomogeneity of the sample and/or of the heterogeneity of the cooling itself, certain zones solidify before others. Due to thermal expansion, permanent compressive and tensile stresses appear within the sample during the cooling thereof. Qualitatively, the portions where the glass solidified first correspond to the portions where the compressive stresses are concentrated, whereas the portions where the glass solidified with a delay concentrate the zones of tensile stresses. The edge stresses described in the present application are membrane stresses which may be defined at any point M of the material and for a given direction as the average of the field stressed at this point and along this direction, the average being made in the entire Thickness of the sample. At the edge of the sample, only the component of membrane stress parallel to the edge is appropriate; the perpendicular component has a zero value. Therefore, any measurement method allowing a measurement of the average stresses along an edge and through the thickness of the sample is relevant. The methods for measuring edge stresses use photoelasticity techniques. The two methods described in the ASTM standards cited below make it possible to measure the edge stress values:

the method using the Babinet compensator and described in the standard ASTM C1279-2009-01, procedure B;

the measurements carried out with commercial apparatus such as the Sharples model S-67 sold by the company Sharples Stress Engineers, Preston, UK and using a Sénarmont of Jessop-Friedel compensator. The principle of the measurement is described in the standard ASTM F216-2005-01.

Within the context of the present application, the compressive stress values are determined by the method described in the standard ASTM F218-2005-01.

Generally, the compressive stress values are determined between 0.1 and 2 mm from one edge and preferably between 0.5 and 1 mm from one edge. For the case where a local zone of compressive stress does not surround an orifice insofar as it is a zone allowing for the possibility of creating an orifice subsequently, then the stress value can be determined after drilling an orifice followed by measurement of the stress at the distance from the edge of the orifice as has just been indicated.

A known process for manufacturing laminated glazing having specific curves for the body for which it is intended and generating compressive stresses at the edge of a cut-away portion of this glazing, consists in:

drilling, independently of one another, two flat glass sheets at the desired location of the site of the cut-away portion;

grouping together the two glass sheets by superposing them (but with no polymer interlayer at this stage), carrying out the bending thereof by gravity at the bending temperature (the glass being hot; it is recalled that the bending step is used to give the curves and therefore the final three-dimensional shape to the glazing);

carrying out a general controlled cooling of the whole of the glazing generating compressive stresses;

placing an intermediate sheet of polymer material (generally of polyvinyl butyral type often referred to as PVB) between the two once more superposed sheets, performing a degassing, that is to say eliminating the air trapped between the glass sheets and the interlayer, and assembling them in an autoclave;

completing the hole by cutting the PVB at the two drillings in the glass (alternatively, it is also possible to cut the hole in the PVB sheet before assembly).

However, this process has certain difficulties to be overcome:

despite drillings made independently in the two respective glass sheets according to two distinct phases, it is advisable to ensure a good concentricity of the two drillings when the two glass sheets are then combined;

the concentricity of these drillings must also be perfect during the bending phase which precedes the controlled cooling step, if not certain peripheral parts of each drilling are confined, cooling more slowly, generating substantially lower compressive stresses. However, this perfect arrangement, even more sensitive when, in particular, the size of one of the glass sheets is in general slightly larger than that of the other sheet for a laminated product, depends on the deposition precision, on the placement and maintaining of the sheets with respect to one another on the bending tool and during the conveyance of the glass sheets into the furnace;

various complications may arise during the degassing depending on the process used; in particular, if an assembly is carried out by calendering, the pressing of the glass sheets with the interlayer mechanically and directly stresses the periphery of the hole. If the latter has inhomogeneous compressive stress zones, breakage of the glazing may occur. Another method of degassing, consisting in drawing the vacuum between the glass sheet and the PVB sheet (by the green snake method [peripheral seal in which the vacuum is drawn] or the vacuum bag method) is difficult to implement because the holes on the sheets do not make it possible to correctly draw the vacuum;

the fact of bending pre-drilled glass makes optical defects in reflection appear (slight distortion at the periphery of the hole).

Another manufacturing process consists in carrying out a bending operation sheet by sheet and not simultaneously with the sheets superposed such as described above, eliminating the drawbacks pertaining to the latter process. However, this independent bending of the glass sheets has certain limitations such as:

the two glass sheets must be enameled at the periphery;

when the thicknesses or the colors are different between the two sheets, the forming thereof is not completely identical and a reliable and robust assembly of these two sheets becomes difficult to carry out;

it is tricky to assemble complex parts, especially for glazings with cuttings of the notched type.

Another solution has also been developed for manufacturing laminated glazing comprising a part fastened in the adapted recess of the glazing. U.S. Pat. No. 4,124,367 thus proposes, in order to overcome the risk of manufacturing laminated glazing for which the recess would have compressive edge stresses that would be lower in one of the glass sheets risking the breakage of the glazing during the fastening (by screwing or bonding) of a part into the recess, to only create compressive stresses at the edge of the recess for a single glass sheet, this glass sheet additionally having an orifice with a dimension of less than that of the other associated glass sheet. Consequently, the part is fastened only to a single glass sheet, the one having a smaller orifice and that is provided with controlled compressive edge stresses.

Nevertheless, the final product is less robust to mechanical stresses since the part is only attached to a single glass sheet.

The objective of the invention is in particular to propose a process for manufacturing laminated glazing provided, over its entire thickness, with at least one cut edge after assembly of the glass substrates as a laminate, said edge having compressive edge stresses. The cut edge may in particular have the shape of a hole or a notch. This process is simplified with respect to existing processes for laminated glazing with holes or notches. It guarantees compressive stresses of the cut edge with a homogeneous and sufficient intensity along this edge, for all the glass substrates assembled in the laminated glazing.

According to the invention, a cut-away portion in the laminated glazing is a hole or a notch that passes through the whole of its thickness. A hole (or orifice) has a contour that is closed on itself entirely within the main faces of the laminated glazing. A notch constitutes a discontinuity of the outer edge of the glazing in order to form a portion that is cut away toward the inside of the main faces of the glazing. It is in a way an open hole in the edge of the glazing.

The invention also makes it possible to cut laminated glazing (without necessarily actually producing a hole or a notch) along a specific line after its assembly, as soon as the glass substrates that it contains have undergone a particular local cooling at the lines that have to be cut after assembly. In this case, the cutting of the laminated assembly may lead to several portions separated from one another, each of these portions nevertheless having the edge stresses necessary for their solidity over their entire perimeter. The advantage here is of being able to have various portions that are perfectly coincident with one another at their edges (cut according to the invention) and as regards their general shapes, the curves of one of the portions inevitably running perfectly on from another portion, when the various portions are brought together via their cut edges according to the invention.

According to the invention, the process for manufacturing laminated glazing comprising at least two glass substrates and at least one interlayer made of a polymer material arranged between the substrates, the process comprising the bending of the substrates, the controlled cooling of the substrates, the assembly of the substrates and of the interlayer, is characterized in that it comprises the following steps in the following order:

bending of the substrates, then
controlled cooling of the substrates, then
formation of a laminated assembly comprising the substrates and the interlayer, then
cutting the laminated assembly through its entire thickness along a line (which covers the fact that the line is in several portions if there are several holes) on one of its main faces, the controlled cooling comprising a general controlled cooling and a local controlled cooling of the zone comprising the cutting line, the local controlled cooling being faster than the general controlled cooling.

The expression "glass substrate" means: individual glass sheet which may or may not be covered with one or more layers (such as anti-reflection layers, solar-control layers, anti-abrasion layers, etc.). A glass sheet comprises two main faces; the same is true for a glass substrate. The expression "laminated assembly" may denote the final laminated glazing before the cutting thereof according to the invention when it is the glazing after cutting that is mounted on the motor vehicle.

Within the context of the present application, a difference is made between the following two types of coolings applied to the glass substrates:

a) The "general controlled cooling" which makes it possible to generate compressive stresses on the outer edges of the substrates in order to obtain a sufficient mechanical strength at these edges. This cooling is applied globally to the whole of the glazing. This type of global cooling is well known to a person skilled in the art.

b) According to the invention, a "local controlled cooling" is applied in order to generate compressive stresses that enable the cutting in the glass after bending and that furthermore cause the presence of compressive stresses on the edges of the line which will then be cut. This local controlled cooling is faster than the general cooling.

Thus, the process of the invention provides several advantages with respect to the prior art processes, in particular;
- it limits the cutting (or drilling) to a single step after formation of the laminated assembly, through the entire thickness of the laminated assembly comprising the two glass substrates and the interlayer, instead of two cutting operations before bending for each of the glass substrates, and a finishing operation in order to remove the interlayer portion between the two cut portions of the substrate;
- the problem of the relative positioning of the two glass substrates during bending is avoided;
- the presence of a hole during the assembly makes the degassing operation complex, drilling after assembly simplifies the degassing operation;
- the optical quality is improved, in particular for the optical distortions in reflection in the vicinity of the cut zone.

Moreover, the process makes it possible to produce compressive stresses on the edges created by the cutting according to the invention for each of the two assembled glass substrates. Thus, any part to be fastened in a recess produced according to the invention may be fastened to the two assembled glass substrates and not to only one as in the prior art, guaranteeing a better fastening strength.

According to one feature, the local controlled cooling constitutes an inhomogeneous cooling of the main faces. If the local controlled cooling is applied to the glass substrates separately (glass substrates not side-by-side), it may be applied to only one or both main surfaces of each glass substrate. If the local controlled cooling is applied to a stack of glass substrates (which are therefore side-by-side), then the local controlled cooling may be applied to only one or both main surfaces of the stack.

The local controlled cooling of the zone comprising the line intended to be cut is faster than the general controlled cooling of said substrates. The local cooling is applied at the line to be cut subsequently. This local cooling zone covers the entire cutting line generally from at least 1 mm on either side of this line. In certain cases, the local cooling may also be widened to a neighboring zone which will be removed from the laminated assembly but which will not necessarily be directly subjected to the cutting tool. By way of example, if it is desired to produce a hole having a diameter of a few centimeters in the laminated assembly, the local cooling can be carried out over the entire surface corresponding to the hole (in fact in a manner slightly more spread out than the hole), whereas the cutting will only be applied around the contour of the hole. In the case of a hole having a relatively large dimension (the case of cutting the orifice corresponding to the opening of an opening sunroof), it is preferable to apply the local controlled cooling only to the line intended to be cut. Indeed, it is pointless to apply this local controlled cooling to the entire surface intended to be cut away if the latter is large. The method of local cooling following the contour of the zone to be cut is preferred when the smallest dimension of the zone undergoing the local controlled cooling has a dimension of greater than 80 mm in the main face of the glazing. It remains possible for smaller dimensions. When a recess exceeds a width of 80 mm at any one of its points, it is preferable to apply the local cooling to the contour of the recess (and not to the entire surface of the recess).

The local controlled cooling is obtained by convection, conduction, radiation, or a combination of these means.

Generally, the local controlled cooling is applied between the start and the end of the general cooling. However, beginning the local cooling toward the end of the bending operation when the general cooling, has not begun is not ruled out. Thus, the local controlled cooling is generally applied in a cooling chamber preferably at the start of the general cooling of the glazing in the cooling chamber. As a variant, it may be started at the end of the bending chamber.

A controlled cooling chamber applies the general controlled cooling. If the local controlled cooling is also applied therein, this chamber is furthermore equipped with means necessary for the application of this local controlled cooling. These means may, for example, be a nozzle that locally blows onto one of the faces of the superposed sheets. It may also be a cold metal component (cooled internally by air for example) that comes into contact with the local zone to be cooled more rapidly.

Advantageously, the bending and the cooling are both carried out on the two glass substrates arranged side-by-side (that is to say which are juxtaposed, in particular superposed, without any means of adhesion between the substrates). In particular, the two side-by-side substrates may move into at least one bonding chamber then into at least one controlled cooling chamber, the localized controlled cooling possibly beginning in the last bending chamber or in a controlled cooling chamber.

The bending of side-by-side glass substrates is carried out with no organic material between them considering the temperature needed for the thermal bending. The thermal bending is carried out before assembly with the interlayer of polymer material since the latter begins to degrade from 160° C. with formation of bubbles. If it were cooled from such a low temperature, it would furthermore be impossible to generate permanent compressive edge stresses in the glass.

The bending of glass substrates may especially be carried out by pressing and/or suction at the bending temperature, as taught by WO 02/064519, WO 2006/072721 and WO 2004/087590, This bending is carried out on the glass substrates having to then be assembled, in a side-by-side manner. In particular, the two side-by-side glass substrates may move into chambers for pre-bending via gravity, then into a pressing and/or suction chamber and finally into controlled cooling chambers, the local controlled cooling optionally beginning at the end of the pressing or in the cooling chambers. The whole of the controlled cooling, which begins at a temperature above 580° C. (generally between 650 and 580° C.), is carried out in the cooling chambers, optionally beginning first in the last bending chamber, at least until the temperature drops to 520° C., or even below this temperature.

The (general and local) controlled cooling is applied when the superposed glass sheets have just been bent at their bending temperature. The entire cooling process is generally carried out directly starting from the bending temperature. Outside of the zones that are undergoing the local controlled cooling, the temperature of the glass generally drops from the bending temperature to ambient temperature without ever going back up (monotonic temperature drop).

The fact of simultaneously bending, in the side-by-side state, the two sheets intended to be assembled has the advantage that the various glass substrates may be of optionally different thickness and color. Indeed, the two substrates will certainly take on the same curvatures despite their differences.

The bending of the glass substrates may also be carried out by pressing and/or suction applied to the glass substrates individually ("sheet by sheet").

The bending is not necessarily applied in a chamber, it being possible for the bending tools to be in the open air.

Similarly, the general and local controlled coolings are not necessarily applied in a chamber.

Preferably, the start of the general controlled cooling is controlled between 0.3 and 8° C./second, and more preferably between 0.3 and 2° C./second until the temperature of the glass (between 650 and 580° C. on leaving the bending operation) reaches at least 520° C.

For the case where the glass substrates are side-by-side before the local cooling, the local controlled cooling is applied from a single side opposite one of the faces of the two side-by-side glass substrates, or else from two opposite sides of the two side-by-side glass substrates that are facing each other. If the local controlled cooling is applied against the surface of a single glass substrate, it produces its effects throughout the thickness of the two side-by-side glass substrates, insofar as the thickness of the side-by-side substrates is not too large, of course, and the local cooling is of sufficient duration and intensity. The local controlled cooling may be applied from a single side of the stack of substrates subject to guaranteeing a local controlled cooling that is faster, throughout the thickness, than the general controlled cooling. It may also be applied from both sides, and the coolings applied on each side must be in this case facing each other.

The local controlled cooling is sufficient in duration and in intensity so that the edge stresses after cutting of the laminated assembly are greater than 4 MPa and preferably greater than 8 MPa. Routine tests readily enable this adjustment.

The general controlled cooling of the glazing may, as is known, use heat transfer such as convection, radiation, conduction or a combination of these three heat transfer methods.

In the present application, the zone having undergone the local controlled cooling may be referred to as the "compressive zone" or "compression zone".

The differentiated and localized cooling of the glass substrates in order to obtain compression zones may be carried out by any means, for example by convection, or radiation, or else conduction, or even a combination of these means. This local differentiated cooling consists in cooling more rapidly over the line intended to be cut after assembly of the glass substrates than the rest of the glazing.

Convection consists in blowing cold air (air at ambient temperature) aimed at the zones that it is desired to put under compression. Depending on the average cooling rate of the glazing, the temperature of the injected air and/or the intensity of the blowing will be adjusted.

Conduction aims to bring the portions of the glass that it is desired to cool more rapidly into contact with a material that is colder than the surface of the glass.

Regarding radiation, it is possible to use a colder material that is placed opposite the glass. The heat exchange via radiation will enable a greater local cooling of the zone facing the material.

According to another example, masks are used that limit the cooling rate outside of the zones where it is desired to establish compressive stresses. Zones are thus created outside of the masks that correspond to the compression zones, for which the cooling of the glass is greater.

An example of a mask is an insulating material, in particular fibrous material, having a surface area equivalent to that of the glazing and in which openings are made. The material is placed close to the hot glass during its cooling phase. Placed in a cold atmosphere, the portions of the glazing that are opposite the openings cool more rapidly than those which are masked.

It is consequently possible to use coating materials that increase or decrease the emissivity of the glass at the surface.

It is possible to use a coating with greater emissivity than the surface of the glass and to put it against the desired compression zones; these zones will then cool more quickly.

Conversely to the example above, it is possible to use a coating with lower emissivity than the surface of the glass and to put it against the surface of the glass outside of the desired compression zones; these zones will then cool more slowly than the zones to be put under compression.

As materials that increase or decrease the emissivity of the glass at the surface, it is possible to use materials that enable the surface of the glass to be easily coated. In this case, they are preferably non-toxic, temperature-resistant and are readily dispersible or soluble in water.

The start of the general cooling is preferably controlled between 0.3 and 2° C. per second from the end of bending temperature, between 580° C. and 650° C., on leaving the bending operation until the temperature of the glass reaches 520° C., or even lower.

Below 520° C., it is possible to apply a convective cooling of the whole of the glazing in order to accelerate the process. Below 480° C., it is pointless to continue applying the local controlled cooling, since the whole of the glazing can then undergo the same general cooling. The glass leaves an optional cooling chamber in general at less than 300° C.

By way of example, the local controlled cooling is applied by means of an air-blowing nozzle, one end of which has a cross section of suitable shape in order to blow onto the line to be cut, and is affixed against at least one of the glass substrates at the line to be cut. For example, if the line to be cut has the shape of a circle, the orifice of the nozzle may have the shape of a disk or a ring. In the case of a disk, the diameter of the disk is slightly greater than that of the circle to be cut and it is the entire surface within the circle that will undergo the local controlled cooling. In the case of a ring-shaped nozzle, the nozzle blows over a ring-shaped zone on the circle and not inside this ring.

As a variant or in combination, the local controlled cooling is obtained by application, against or in the vicinity of the surface of the glass, of a temporary coating material in particular of fabric type that increases or decreases the thermal radiation toward or emitted by the glass, and that is provided with at least one opening, this opening corresponding to the zone comprising the cutting line or else to the remaining portion of the glazing (zone not comprising the cutting line) depending on the type of material. In this case, the differentiated cooling (local cooling more intense over the line to be cut than the general cooling next to the line to be cut) is obtained here by acting on the difference in thermal radiation emitted by the glass as a consequence of the application of the temporary coating material.

As a variant or in combination, the local controlled cooling is obtained by application, against the surface of the glass, of a contact material at a temperature below that of the glass, the zones in contact comprising the line to be cut. It may be a component made of cold metal such as steel covered with a metallic fabric in order to prevent thermal shocks. A coolant (air or water) may run through this cold metal component in order to keep it cold. The differentiated cooling (local cooling faster than the general cooling next to the zone to be cut) is obtained here by acting on the difference in heat transfer by conduction emitted by the glass as a consequence of the application of the contact material.

The process of the invention in particular provides laminated glazing for which the dimension of the cut is adapted to the particular use of the glazing.

According to the invention, the cut edge may be intended to receive a functional part (such as an antenna, a brake light, a camera, etc.) fastened to the two assembled glass substrates, or may act as a simple passage for shafts or cables, and/or constitutes the open portion of an opening sunroof.

The invention also relates to laminated glazing comprising at least two glass substrates and at least one interlayer made of a polymer material arranged between the substrates, and at least one cut-away portion (orifice or notch) in its thickness, characterized in that the cut contours of the two glass substrates in the cut-away portion have a perfect superposition, and in that the compressive edge stresses of these contours are greater than 4 MPa, preferably greater than 8 MPa. The compressive edge stresses are generally less than 20 MPa.

The laminated glazing may be shaped at the edge of the cut, for example chamfered on at least one of the substrates, or on both substrates.

As an application example, the laminated glazing may be a rear window of a motor vehicle, it being possible for the cut material to constitute an orifice (cut-away portion) for the passage of an equipment component such as a wiper shaft. The contour of the orifice has compressive edge stresses in accordance with the invention.

As another application example, the laminated glazing constitutes an opening sunroof, it being possible for the cut material to constitute a cut-away portion forming the opening of the roof. According to this embodiment, the cut constituted an orifice entirely within the main faces of the laminated glazing. According to another example, the invention enables the production of a vehicle roof, the laminated glazing constituting an opening sunroof, cut into at least two portions after assembly as a laminate, said portions being perfectly coincident at the location where the cutting according to the invention was made. Such a type of roof may therefore be opened by moving one of the roof portions, or even moving several roof portions. The type of cutting according to the invention suitable for this type of application is represented in FIG. 3f. Thus, the invention also relates to a process for manufacturing an opening sunroof of a vehicle, comprising the process of preparing laminated and cut glazing according to the invention, the cutting producing two portions, each portion comprising an edge, the contour of which coincides with an edge of the other portion, said two edges having been produced by cutting, the two portions being mounted as an opening sunroof of a vehicle with the aid of fastening and guiding means, it being possible for the two portions to move closer together or move apart in accordance with the guiding means in order to close said roof by juxtaposition of the two edges or in order to open said roof by separating the two edges. A single one of these laminated glazing portions may be movably mounted on the vehicle or the two portions may be movably mounted on the vehicle. The fastening means are those connecting the glazing in two portions to the vehicle. The guiding means are those that impose the movement of one or both portions during the opening or closing of the opening sunroof. The movement may be a lifting followed by a translation or a rotation or any other movement that makes it possible to open and reclose the roof by moving one or both portions of the laminated glazing. The edges of the portions that are moved apart or closer together during the opening or closing of the roof are those which were created during the cutting and this is why they coincide perfectly. Of course, on closing the roof, the edges are brought together with the same direction as they were created during the cutting.

The cutting step is obtained by known cutting means such as a diamond hole saw, a diamond router or a water jet.

Depending on the cutting means chosen, it is possible to cut the laminated assembly from a single one of its main faces or from both of its sides at once via one of the following means:

hole saw or router: preferably the two main faces are cut at the same time, water jet: a single side is sufficient.

The number of operations in the process for manufacturing laminated glazing according to the invention is reduced compared to the known processes for cutting before bending. Furthermore, obtaining a perfect continuity of the edges of the cut along the two glass substrates and in the thickness of the assembled glazing is ensured.

Finally, this manufacturing process finds all its advantages in the particular application according to which the laminated glazing constitutes an opening sunroof. Indeed, a saving of material is achieved because the cut portion corresponding to the material of the recess of the glazing can be recovered in order to manufacture the opening of the roof. Furthermore, perfect geometric continuity is ensured between the roof around the opening and the opening, which is currently difficult to achieve by standard processes when the two glazings (on the one hand the roof comprising an orifice fastened to the vehicle and on the other hand the moving portion that conceals this orifice) are formed by two independent manufacturing processes.

The invention also makes it possible to produce laminated glazings comprising at least one local compressive zone that permits the cutting. It is thus possible to market laminated glazing of this type, which is not cut but that comprises a compressive zone that permits the cutting, it being up to the client to carry it out or not. It is therefore possible, for example, to mount such uncut but cuttable glazing as a motor vehicle roof. The owner of the vehicle can then decide, or not, to carry out the cutting in order to form an opening sunroof on his vehicle. Of course, the location of the compressive zone is duly identified by the manufacturer so that the location of the cutting is clearly established. Laminated glazing comprising at least one local zone of compressive stresses within its main faces is also the subject of the invention as an intermediate product. This local zone of compressive stresses is different from the compressive stresses of the outer edges of the glazing forming a peripheral border of compressive stresses. The local zone of compressive stresses is within this border of compressive edge stresses. The local zone may however join the border of compressive edge stresses. Thus, the invention also relates to laminated glazing comprising at least two glass substrates and locally comprising, in each of the glass substrates and facing each other in all the glass substrates (the compression zones are placed at the same location, that is to say superposed from one glass substrate to the next in the laminated glazing), a zone comprising compressive stresses enabling the cutting of said glazing along a line included in said zone in order to form, after cutting, edges having compressive edge stresses of greater than 4 MPa, preferably of greater than 8 MPa. Generally, the compressive edge stresses after cutting are less than 20 MPa. The glazing can therefore be manufactured free of orifices in the local zone of compressive stresses. The cutting in this zone is carried out subsequently on the instructions of the vehicle owner and may be used, for example, to develop an opening sunroof or orifices for fastening roof bars. Thus, the invention also relates to a vehicle roof (generally a motor vehicle roof) comprising laminated glazing comprising compressive stresses that make it possible to drill orifices in the laminated glazing after mounting on the vehicle.

The compressive edge stresses in the peripheral border are generally between 4 and 20 MPa. The border of compressive edge stresses generally has a width on each main face of the glazing of 0.1 to 3 cm counting from the outer edge.

The laminated glazing "to be cut" according to the invention is generally symmetrical with respect to a longitudinal median plane passing through the middle of its front transverse strip and the middle of its rear transverse strip (the "longitudinal" direction corresponding to the direction of travel of the vehicle, the "transverse" direction being perpendicular to it). This plane also passes through its barycenter. The laminated glazing according to the invention may comprise at least two local zones of compressive stresses enabling, after drilling of orifices within said zones, the fastening of a roof bar, fastening components of said bar passing through said orifices. These zones of compressive stresses are generally placed symmetrically with respect to the plane of symmetry of the glazing (longitudinal median plane) passing through the middle of the front transverse strip and the middle of the rear transverse strip of the glazing. The laminated glazing according to the invention for the application as a vehicle roof with the possibility of fastening roof bars comprises two, four or six local zones of compressive stresses enabling, after drilling orifices in said zones, the passage of fastening components of two roof bars. For this application, each zone of compressive stresses generally has an area between 0.5 cm² and 70 cm². Each zone of compressive stresses is generally at less than 30 cm and more generally less than 20 cm from a longitudinal edge of the laminated glazing serving as the roof.

The present invention is now described with the aid of purely illustrative examples that in no way limit the scope of the invention, and using the appended illustrations, in which;

FIGS. 3a to 3l are various exemplary embodiments of geometric shapes of localized controlled cooling;

Figure 1:
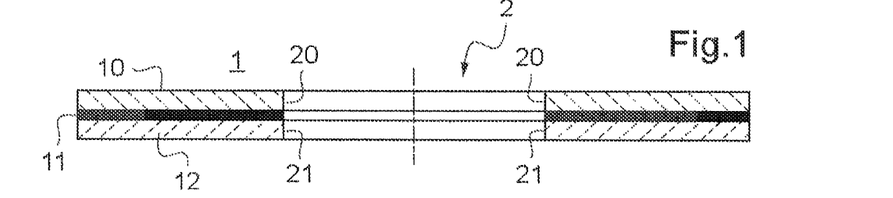
FIG. 1 represents a partial schematic cross-sectional view of laminated glazing obtained according to the process of the invention.

FIG. 1 illustrates a partial cross-sectional view of laminated glazing 1 comprising at least, depending on its thickness, one cut-away portion 2. The glazing comprises at least two glass sheets or substrates 10 and 12, and an interlayer or intermediate sheet 11 made of polymer material arranged between said glass substrates. After manufacture, the glazing has the cut-away portion 2 obtained by drilling of the two glass substrates and of the interlayer, after the assembly thereof. The orifice obtained in the first substrate has a contour 20 while the other orifice in the second substrate has a contour 21. According to the manufacturing process of the invention:

The two contours 20 and 21 are perfectly superposed; according to the cross-sectional view, the edges of the substrates over the entire periphery of the contours are perfectly aligned; of course, if the drilling is carried out simultaneously from the two main faces of the glazing, it is advisable to ensure the alignment of the drilling tools on either side of the glazing. In particular, waterjet cutting can be carried out from a single side of the laminated glazing.

The contours 20 and 21 both have compressive edge stresses of greater than 4 MPa, and preferably of greater than 8 MPa.

Figure 2:
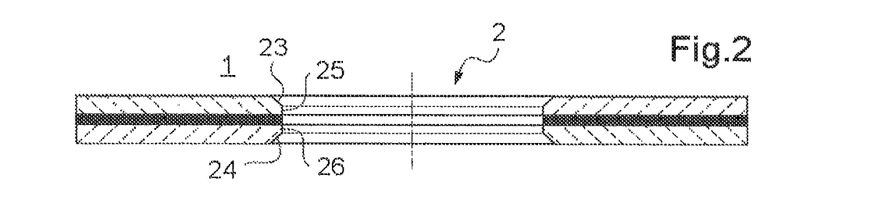
FIG. 2 is a variant of FIG. 1.

The orifices of the substrates may be shaped depending on the application. For example, FIG. 2 shows the recess 2 with chamfers 23 and 24 on each of the outer edges of the two contours 25 and 26. The recess 2 has dimensions adapted to the application that is made thereof. This recess is used, for example, to fasten a functional or aesthetic part such as an antenna, a fan, a trim, or is used as a passage for a cable, etc. If it is of large dimensions, this recess may constitute the opening of a glass opening sunroof for a vehicle, in particular for a motor vehicle.

The process for manufacturing the glazing comprises various steps which will be successively described. The individual glass substrates 10 and 12 are first cut along their outer edges by a standard method for cutting glass in order to provide substrates having the desired external peripheral shapes, according to the cutting of primitives, the cutting to shape, the break-out thereof and the optional shaping thereof. One or more optional additional steps of screen printing may be carried out, depending on the application. On the production line, many substrates are thus prepared on the run. Then, with the substrates running on the production line, a step of pairing is carried out. The substrates 10 and 12 are combined together by superposition. The superposed substrates are then bent together to the desired shape by the chosen bending process. The superposition of the glass substrates for this bending step makes it possible to obtain glasses having perfectly coincident general shapes. According to the invention, a step of general and local controlled cooling is then carried out. The local cooling is generated on at least one zone of a peripheral face of the side-by-side substrates corresponding at least to the zone which will be cut at the end of the process. The objective of the local controlled cooling is to obtain compression zones in the thickness of the glazing at the cut edges.

The localization of the cooling in the zones intended to be cut targets both surfaces and contours. The localized cooling may in particular be carried out along a simple line crossing the glazing from one edge to another edge, or even from one edge to the same edge. FIGS. 3a to 3l illustrate nonlimiting exemplary embodiments of local controlled coolings over zones with various shapes.

Figure 3A:
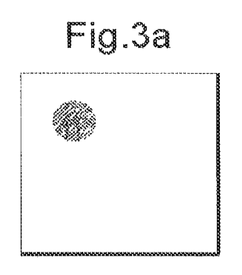

FIG. 3a presents a local compression zone in the form of a closed circular contour and having a surface (hatched surface) delimited by this circle, making it possible for example to obtain the glazing from FIG. 1.

Figure 3B:
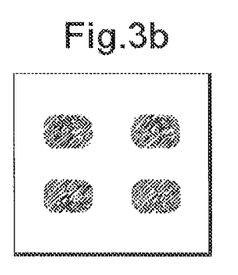

FIG. 3b shows several local surface compressive zones that are independent of one another.

Figure 3C:
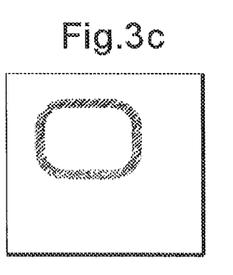

FIG. 3c illustrates a local compression zone that is in the form of a single closed contour, the interior of the contour not being part of said zone.

Figure 3D:
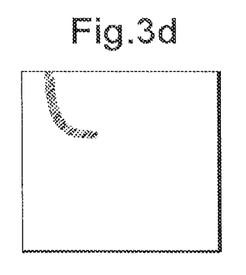

FIG. 3d shows a local compression zone in the form of a curved line reaching the edge of the glazing at only one of its ends.

Figure 3E:
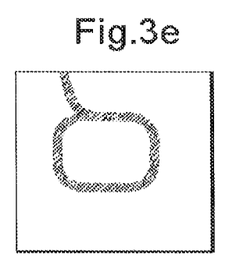
Figure 3F:
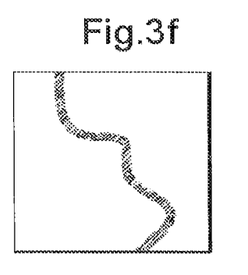

FIG. 3e illustrates a local compression zone in the form of a closed loop and having a curved line going from this loop to the edge of the glazing.

FIG. 3f shows a local compression zone in the shape of a curved line starting from one edge of the glazing and reaching the opposite edge (the line could also return to an edge adjacent to the starting edge).

Figure 3G:
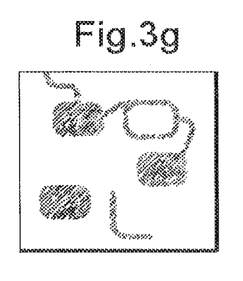

It is also possible to connect independent local compression zones using one or more lines that may or may not reach the edge of the glazing, as illustrated in FIG. 3g.

Figure 3H:
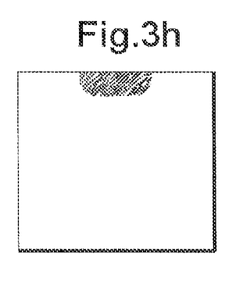
Figure 3I:
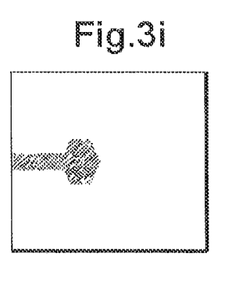

FIGS. 3h and 3l show a compression surface beginning from one edge of the glazing forming a specific notch and reaching the same edge of the glazing.

Figure 4:
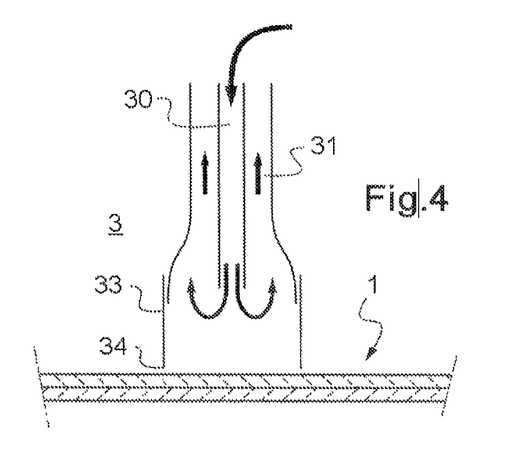
FIG. 4 is a schematic partial cross-sectional view of a device for local controlled cooling by blowing applied to the surface of the glass.

FIG. 4 illustrates a schematic device 3 suitable for blowing onto one of the sides of the side-by-side substrates. Here, air is blown at ambient temperature over a disk-shaped area as shown by FIG. 3a, with a view to subsequently producing the recess from FIGS. 1 and 2. The blowing time is between 40 and 90 seconds approximately. The blowing duration is independent of the surface area to be cooled in a differentiated manner but, on the other hand, depends on the thickness of the glass. The 40 seconds of local cooling are established for substrates each having a thickness of 2.1 mm. The blowing nozzle has en ending with a shape adapted to the geometric shape of the local zone of compressive stresses to be obtained. It may in particular have the shape of a rectangular contour for a recess of relatively large dimension such as, that targeting an opening sunroof application. In FIG. 4, the nozzle 3 comprises a central air supply duct 30, an axially symmetric duct 31, around the central supply duct 30. The duct 31 opens, as ending of the nozzle, into a cylindrical bell 33, the wall of which is constituted of a flexible felt based on metal fibers. The free end 34 of the bell is put against the surface of the glass. Cold air is conveyed via the supply duct 30 to the bell 34 in order to be released against the surface of the glass to be cooled then discharged via the duct 31. After the cooling, the de-pairing (the dissociation) of the two substrates 10 and 12 is carried out. Then, the steps of assembling with the interlayer 12, of degassing the assembly and of passing into an autoclave are carried out in the standard manner. This treatment leads to bonding between the interlayer and the glass substrates on each side of the interlayer. Finally, the cutting of the glazing is carried out over the zone that has undergone local cooling in order to obtain the desired cut-away portion or portions (by diamond hole saw, diamond router, water jets, etc.).

Figure 5A:
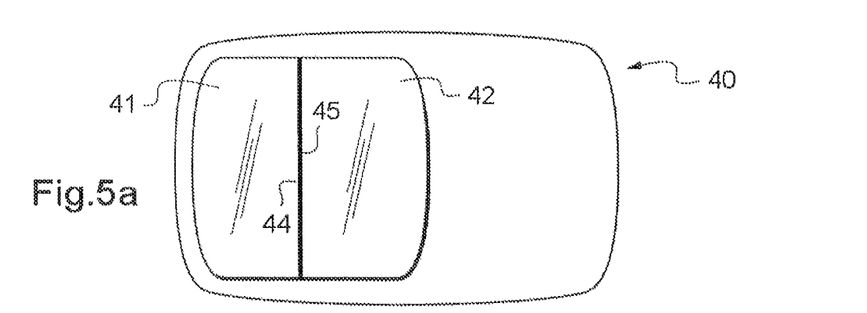
FIGS. 5a and 5b represent a motor vehicle roof panel comprising laminated glazing according to the invention in two portions acting as an opening sunroof, one portion of said glazing being fixed, the other being mobile.
Figure 5B:
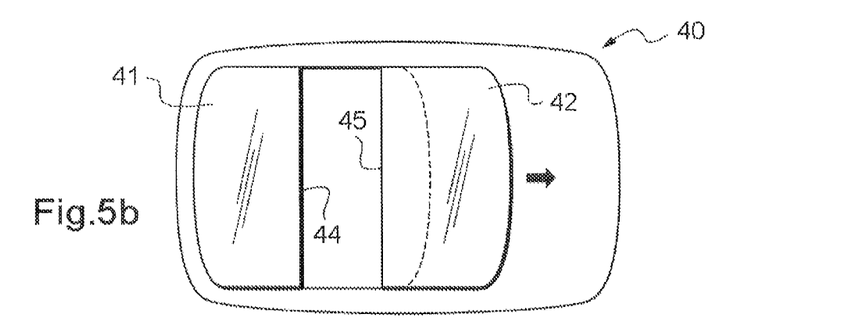

FIG. 5 illustrates a motor vehicle roof 40 comprising laminated glazing according to the invention that acts as an opening sunroof, said glazing being in two portions 41 and 42, one portion 41 of said glazing being fixed with respect to the vehicle, the other portion 42 being mobile. In FIG. 5a), the roof is closed. In FIG. 5b), the roof is open owing to the movement of the portion 42 only (arrow) which comes above the body enclosed in the roof panel of the vehicle. According to the invention, firstly a single laminated glazing was manufactured initially comprising the two portions 41 and 42 not yet cut. According to the invention, a local zone of compressive stresses was created at the location where this glazing was to be cut in a line crossing it completely (line having given rise to the edges 44 and 45 after cutting). The cutting according to the invention was carried out on this line and led to the portions 41 and 42 that are completely independent but for which the edges 44 and 45 are perfectly coincident when the roof is closed (FIG. 5a)).

Figure 6:
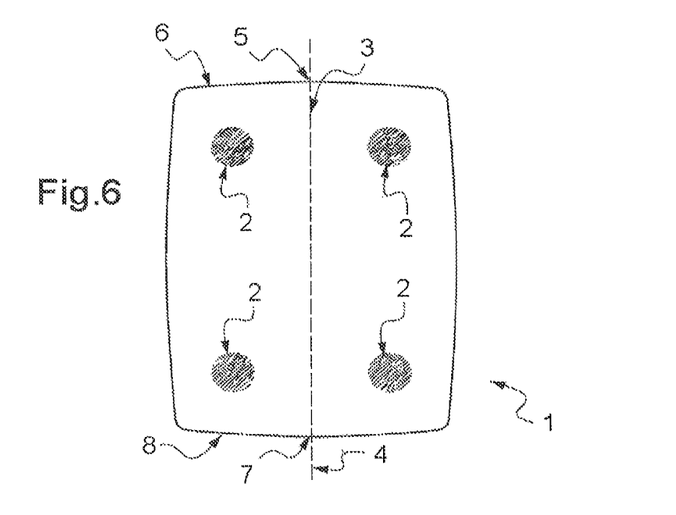
FIG. 6 illustrates laminated glazing comprising orifices or zones of compressive stresses enabling the drilling of orifices.

FIG. 6 represents glazing 1 made of laminated glass. The four hatched disks 2 represent either orifices or local zones of compressive stresses enabling the drilling of orifices. These orifices or local zones of compressive stresses are here completely within a main face 3 of the glazing without sticking out over the outer edge of the glazing (as is the case for a notch). The orifices are placed symmetrically with respect to the plane of symmetry 4 passing through the middle 5 of the front strip 6 and the middle 7 of the rear strip 8 of the panel 1.

Figure 7:
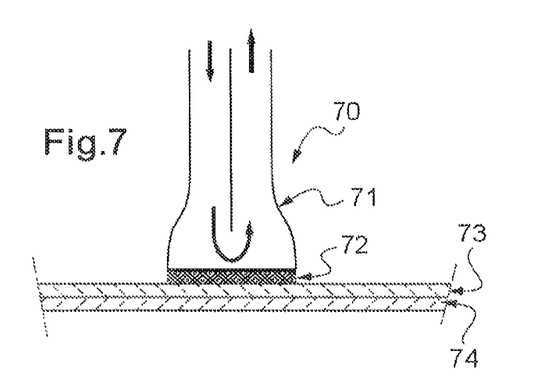
FIG. 7 is a schematic partial cross-sectional view of a local controlled cooling device that comes into contact with the surface of the glass.

FIG. 7 illustrates a schematic device 70 suitable for cooling, via conduction, a local zone through a main face of a stack of two side-by-side substrates 73 and 74. A metal pipe 71, closed at its lower end, has cold air running through it as indicated by the arrows. The contact with the glass between the metal pipe and the glass is softened owing to a felt 72 made of refractory fibers in order to reduce the risk of breakage by thermal shock. This thus results in the formation of a local zone of compressive stresses at the location of the contact between the felt 72 and the glass.

Figure 8:
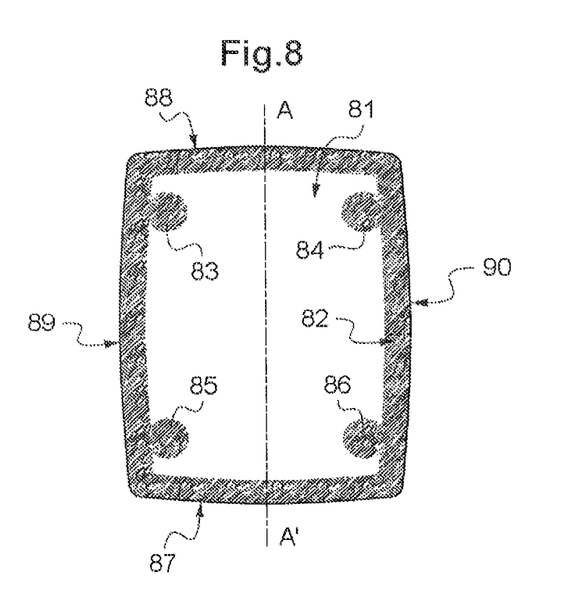
FIG. 8 represents a motor vehicle roof seen perpendicular to one of its main faces and comprising a border of compression and four local zones of compressive stress joining the border, said local zones being ready to receive orifices.

FIG. 8 represents a motor vehicle roof comprising laminated glazing, seen perpendicular to one of the main faces 81. This laminated glazing comprises two transverse edges 87 and 88 and two longitudinal edges 89 and 90. It comprises a border 82 of compressive edge stresses going completely around the glazing. The longitudinal median plane AA' (perpendicular to the figure) is a plane of symmetry of the glazing and is perpendicular to the transverse edges 87 and 88 which are opposite one another. Within the border of compressive edge stresses are four local zones of compressive stresses 83, 84, 85, 86. These local zones here meet the border. These compression zones are represented by hatching but in reality they are not visible to the naked eye. The local zones 83 and 84 are placed symmetrically one opposite the other with respect to the plane of symmetry AA'. The local zones 85 and 86 are placed symmetrically opposite one another with respect to the plane of symmetry AA'. These local zones offer the possibility of drilling orifices through the laminated glazing for the passage of roof bar fastening components. Two roof bars may be fastened, either parallel to the plane of symmetry AA' between the points 83 and 85 for one and between the points 84 and 86 for the other, or perpendicular to the plane of symmetry AA', between the points 83 and 84 for one and between the points 85 and 86 for the other.

The invention claimed is:

1. A bent laminated glazing comprising at least two glass substrates, the bent laminated glazing comprising a border of compressive edge stresses and locally comprising in each of the at least two glass substrates and in a superposed manner in all of the at least two glass substrates a local zone of compressive stresses free of orifices and different from said border, enabling a cutting of said bent laminated glazing along a line within said local zone in order to form, after cutting, an edge having compressive edge stresses greater than 4 MPa.

2. The bent laminated glazing as claimed in claim 1, wherein the border of compressive edge stresses is obtained by general controlled cooling of the at least two glass substrates in a paired state and the local zone of compressive stresses is obtained by local controlled cooling of the at least two glass substrates in the paired state.

3. The bent laminated glazing as claimed in claim 1, wherein the edge formed along the line has compressive edge stresses greater than 8 MPa.

4. The bent laminated glazing as claimed in claim 1, wherein the bent laminated glazing is a roof of a vehicle.

5. The bent laminated glazing as claimed in claim 4, comprising at least two local zone of compressive stresses allowing, after cutting of orifices in the two local zone of compressive stresses, the fastening of a roof bar, wherein fastening components of said roof bar pass through said orifices.

6. The bent laminated glazing as claimed in claim 4, wherein the bent laminated glazing is symmetrical with respect to a longitudinal median plane passing through a middle of its front transverse strip and a middle of its rear transverse strip.

7. The bent laminated glazing as claimed in claim 1, wherein each local zone of compressive stresses has an area between 0.5 cm$^2$ and 70 cm$^2$.

8. The bent laminated glazing as claimed in claim 4, wherein the cutting is that of an opening of the roof.

9. A process for manufacturing a laminated glazing having an edge having compressive edge stresses of greater than 4 MPa, comprising cutting the laminated glazing of claim 1 on the line in order to form the edge.

10. A bent laminated glazing, comprising at least two glass substrates and at least one interlayer made of a polymer material arranged between the at least two substrates, and at least one notch or orifice in a thickness of said bent laminated glazing, wherein contours of the two glass substrates in the notch or orifice have a perfect superposition, and wherein compressive edge stresses of the contours are greater than 4 MPa.

11. The bent laminated glazing as claimed in claim 10, wherein the compressive edge stresses of the contours are greater than 8 MPa.

12. The bent laminated glazing as claimed in claim 10, wherein the bent laminated glazing is a roof of a vehicle and comprises at least two local zone of compressive stresses, each zone of compressive stresses comprising an orifice allowing the fastening of a roof bar, wherein fastening components of said roof bar pass through said orifices.

13. The bent laminated glazing as claimed in claim 12, wherein the bent laminated glazing is symmetrical with respect to a longitudinal median plane passing through a middle of a front transverse strip and a middle of a rear transverse strip.

14. The laminated glazing as claimed in claim 12, wherein each local zone of compressive stresses has an area between 0.5 cm$^2$ and 70 cm$^2$.

15. The bent laminated glazing as claimed in claim 10, wherein the bent laminated glazing is a roof of a vehicle and wherein the roof and the opening are both a laminated glazing and are perfectly coincident at the edges of parts intended to be moved closer together and at the curvatures of all of the glazing.

16. The bent laminated glazing as claimed in claim 10, wherein the bent laminated glazing is a roof of a vehicle and comprises at least two portions that can be moved closer together or moved apart, said at least two portions being perfectly coincident at the edges of the portions intended to be moved closer together and at the curvatures of all of the glazing.

17. The bent laminated glazing as claimed in claim 10, wherein the bent laminated glazing is a motor vehicle rear window and wherein the orifice is for a passage of an equipment component.

18. The bent laminated glazing as claimed 39, wherein the equipment component is a wiper shaft.

19. A laminated glazing comprising at least two bent glass substrates, at least one interlayer made of a polymer material arranged between the at least two bent glass substrates, and at least one notch or orifice cut in an entire thickness of the laminated glazing, wherein the laminated glazing includes a border of compressive edge stresses obtained by general controlled cooling of the at least two bent glass substrates in a paired state so that compressive stresses are generated at the border of the laminated glazing, and a local compression zone, different from said border, and obtained by local controlled cooling of at least one local area of a main surface of the laminated glazing so that compressive stresses are generated in said local compression zone, wherein the at least one notch or orifice is located in said local compression zone and made in the at least two bent glass substrates in a paired state after forming said local compression zone so that cut contours of the two glass substrates in the notch or orifice of the laminated glazing have a perfect superposition, and wherein compressive edge stresses of said cut contours are greater than 4 MPa.

20. The laminated glazing as claimed in claim 19, wherein the compressive edge stresses of said cut contours are greater than 8 MPa.

21. The laminated glazing as claimed in claim 19, wherein the compressive edge stresses of said cut contours are lower than 20 MPa.

22. The laminated glazing as claimed in claim 19, wherein the notch or orifice is chamfered or shaped on at least one of the glass substrates.

23. The laminated glazing as claimed in claim 19, wherein said laminated glazing forms part of a sunroof.

24. The laminated glazing as claimed in claim 19, wherein said orifice is configured to receive an equipment component.

25. The laminated glazing as claimed in claim 24, wherein the equipment component is a wiper shaft.

26. The laminated glazing as claimed in claim 19, further comprising another local compression zone free of orifices and different from said border and said local compression zone.

* * * * *